United States Patent Office 2,983,764
Patented May 9, 1961

2,983,764
PROCESS FOR THE PREPARATION OF FLUOROCARBON COMPOUNDS

Donald Fred Knaack, Wilmington, Del., assignor to E. I. du Pont de Nemours and Company, Wilmington, Del., a corporation of Delaware No Drawing. Filed Aug. 31, 1959, Ser. No. 836,862

7 Claims. (Cl. 260—653.1)

The present invention relates to the formation of fluorocarbon solvents, and, more particularly, to the formation of internally unsaturated dimers and trimers of hexafluoropropylene.

The internally unsaturated dimers and trimers of hexafluoropropylene have the general formulas $C_6F_{12}$ and $C_9F_{18}$ and the following structures:

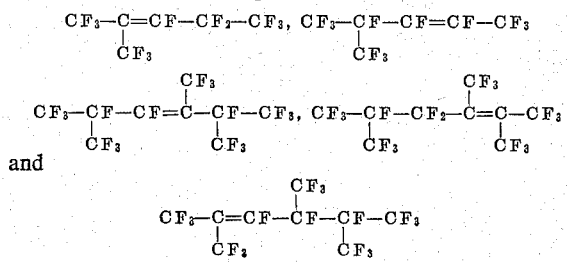

and

These compounds are extremely useful as fluorocarbon solvents, since they, although unsaturated, possess a high degree of chemical inertness.

It is one of the objects of the present invention to prepare fluorocarbon solvents. It is another object to prepare internally unsaturated dimers and trimers of hexafluoropropylene. Other objects will become apparent hereinafter.

In accordance with the present invention, it was discovered that internally unsaturated dimers and trimers of hexafluoropropylene are produced when hexafluoropropylene is contacted with catalytic amounts of a compound selected from the class consisting of tetramethylguanidine and tetrakis(dimethylamino)ethylene at a temperature in the range of 0° to 250° C. The catalysts employed in the process of the present invention are extremely versatile and active in that they can be employed in the absence of a liquid reaction medium. If desired, the process may, however, be carried out in the presence of a solvent such as dimethyl formamide, dimethyl sulfoxide and benzene. The catalysts employed, furthermore, allow the formation of the hexafluoropropylene internally unsaturated dimers and trimers in the presence of tetrafluoroethylene, which is of great technical importance, since hexafluoropropylene is generally either prepared from tetrafluoroethylene or obtained as a mixture of hexafluoropropylene and tetrafluoroethylene. The preferred reaction temperature range is from 50 to 200° C. Catalyst concentration is not critical and may be varied from 0.001 to 10% of the hexafluoropropylene charged.

The invention is further illustrated by the following examples.

EXAMPLES I TO X

Into a 180 ml. stainless steel reaction vessel was charged at a temperature of −50° C. the monomer, catalyst and the solvent, when employed, indicated in the table. The reaction mixture was heated to the temperature indicated and agitated at that temperature for the time shown in the table. The resulting insoluble liquid fluorocarbon products were separated from the remaining reaction mixture. Hexafluoropropylene dimers having boiling points at 46 and 50.5° C. were isolated and were identified as perfluoro-4-methylpentene-2 and perfluoro-2-methylpentene-2. Hexafluoropropylene trimers having boiling points at 110 and 114° C. were also isolated and identified as perfluoro-2,3,5-trimethylhexene-3 and perfluoro-2,3,5-trimethylhexene-2. The dimers and trimers were separated by gas chromatography.

Table

| Example | Monomer | | Catalyst | | Solvent | | Reaction Temperature, °C. | Reaction Time in Hrs. | Dimer-Trimer Product in g. |
|---|---|---|---|---|---|---|---|---|---|
| | Type | wt. in g. | Type | wt. in g. | Type | Quantity in ml. | | | |
| I | Hexafluoropropylene | 30 | tetrakis (dimethylamino) ethylene | 0.86 | | | 50 | 2 | 19.4 |
| II | ----do---- | 30 | ----do---- | 0.86 | Benzene | 25 | 50 | 2 | 17.5 |
| III | ----do---- | 30 | ----do---- | 0.86 | ----do---- | 25 | 200 | 2 | 22 |
| IV | ----do---- | 30 | ----do---- | 0.86 | Dimethyl formamide | 25 | 50 | 2 | 11 |
| V | {Hexafluoropropylene / Tetrafluoroethylene} | 15 / 10 | ----do---- | 1.72 | ----do---- | 25 | 100 | 2 | 14.8 |
| VI | Hexafluoropropylene | 30 | Tetramethylguanidine | 0.88 | | | 100 | 2 | 4.1 |
| VII | ----do---- | 30 | ----do---- | 0.88 | Benzene | 25 | 100 | 2 | 2.9 |
| VIII | ----do---- | 30 | ----do---- | 0.88 | Dimethyl sulfoxide | 25 | 100 | 2 | 21.0 |
| IX | {Hexafluoropropylene / Tetrafluoroethylene} | 30 / 20 | ----do---- | 1.76 | | | 100 | 2 | 9.8 |
| X | {Hexafluoropropylene / Tetrafluoroethylene} | 30 / 20 | ----do---- | 1.76 | Dimethyl formamide | 25 | 100 | 2 | 12.7 |

I claim:

1. Process for the preparation of fluorocarbon solvents which comprises contacting hexafluoropropylene at a temperature of 0 to 250° C. with catalytic amounts of a compound selected from the class consisting of tetrakis (dimethylamino) ethylene and tetramethylguanidine, and recovering a mixture of internally unsaturated, linear dimers and trimers of hexafluoropropylene.

2. The process as set forth in claim 1 at a temperature of 50 to 200° C.

3. The process as set forth in claim 1 in the presence of an inert solvent.

4. The process as set forth in claim 3 wherein the solvent is benzene.

5. The process as set forth in claim 3 wherein the solvent is dimethyl formamide.

6. The process as set forth in claim 3 wherein the solvent is dimethyl sulfoxide.

7. The process as set forth in claim 1 in the presence of tetrafluoroethylene.

References Cited in the file of this patent
UNITED STATES PATENTS 2,691,036    Miller  ---------------- Oct. 5, 1954